(No Model.)

H. G. LANE.
NUT LOCK.

No. 547,724.  Patented Oct. 8, 1895.

WITNESSES:
M. D. Bloudel
Chas. E. Brock

INVENTOR
Henry G. Lane.
BY R. S. & A. Lacey
ATTORNEYS

UNITED STATES PATENT OFFICE.

HENRY G. LANE, OF BUCYRUS, OHIO, ASSIGNOR OF ONE-HALF TO A. H. GARDNER, OF SAME PLACE.

NUT-LOCK.

SPECIFICATION forming part of Letters Patent No. 547,724, dated October 8, 1895.

Application filed March 29, 1895. Serial No. 543,734. (No model.)

*To all whom it may concern:*

Be it known that I, HENRY G. LANE, a citizen of the United States, residing at Bucyrus, in the county of Crawford, State of Ohio, have invented certain new and useful Improvements in Nut-Locks; and I do hereby declare the following to be a full, clear, and exact description of the invention, such as will enable others skilled in the art to which it appertains to make and use the same.

This invention covers an improved means for securing nuts upon their bolts and preventing the rotation or loosening of said nuts.

My invention, though particularly adapted for use upon railroads, can also be used upon bridges, scaffolds, and, in fact, can be used any place where it is necessary to lock a nut against movement.

Now the objects of my invention are to provide an exceedingly cheap, simple, and efficient form of device, one that consists of a few simple parts, and one which can be used repeatedly and can be quickly and easily attached and detached.

With these objects in view my invention consists essentially in making a nut with the recesses in the bottom and sides, placing a washer having an undercut edge beneath said nut, and then striking up the washer in one or more places to enter one or more of the recesses of the nut.

My invention consists also in certain details of construction and combination of parts, all of which will be fully described, and pointed out in the claims.

Figure 1:
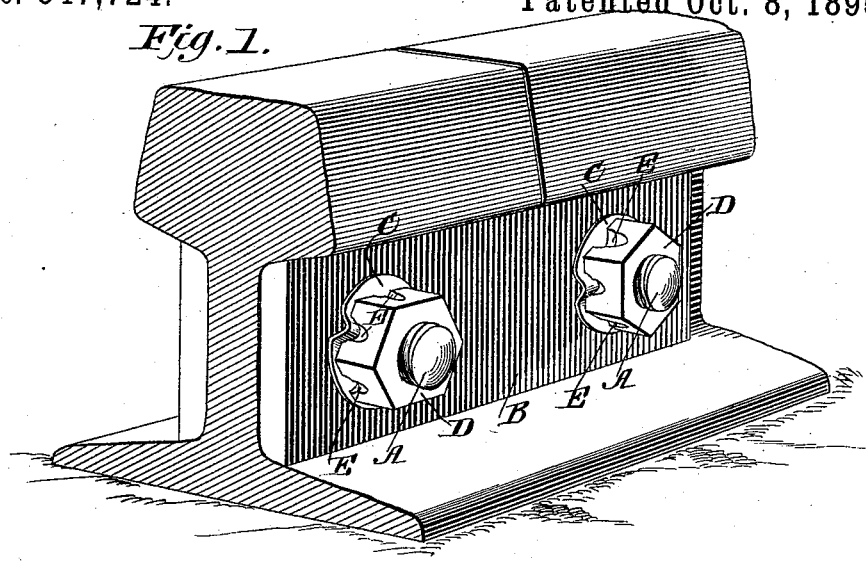
Figure 3:
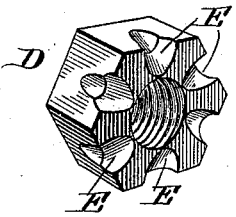
Figure 2:
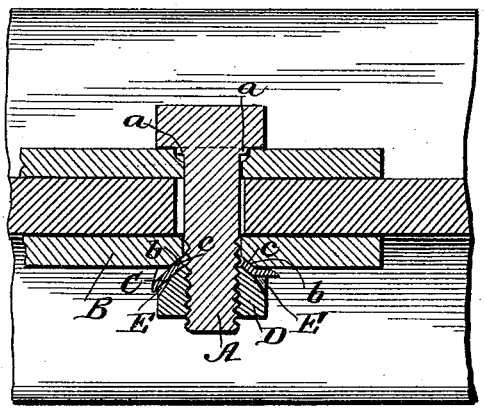
Figure 4:
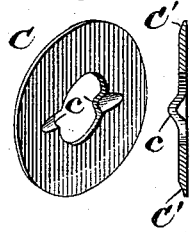

In the drawings hereto annexed, Figure 1 is a perspective view showing my nut-lock in use. Fig. 2 is a sectional view of the same. Fig. 3 is a detail view of the nut, and Fig. 4 a detail view of the washer.

In carrying my invention into effect, I employ a bolt A, which is preferably constructed with spurs *a* near the head to prevent the rotation of said bolt. This bolt is preferably passed through a fish or bearing plate B, but the use of this plate is not at all necessary. A metallic washer C is placed upon the bolt A and rests upon the plate B when such plate is used. This washer is preferably constructed with studs or spurs *c*, which fit in recesses *b* in the plate B, adjacent to the bolt-hole, the purpose of such details being to prevent the washer turning upon the bolt. The edge of this washer is also undercut or beveled, as shown at C', the purpose of which will be made apparent. A nut D is then turned down upon the bolt and binds the washer against the plate B or other object through which the bolt passes and against which the washer rests. A series of recesses E are cut in the lower or inner edges of the nut, said recesses extending into the sides and bottom of the nut, as clearly shown. After the nut has been firmly seated it is locked by striking up or upsetting one or more portions of the washer, so as to press the said portion or portions into one or more recesses of the nut, and this is done by inserting the end of a chisel or wedge beneath the undercut edges of the washer and striking the chisel or tool a sharp blow with a hammer or sledge. In this manner the nut is securely fastened, and when it is desired to remove the nut the upset portion of the washer is hammered down to its initial position and the nut can be easily removed. The purpose of the undercut edge is now apparent, and it will be noted that the washer can be used repeatedly.

A special advantage of this lock is that it is not necessary to bring the nut to any particular position, as any portion or portions of the washer can be struck up to fill one or more recesses.

Although I have shown spurs or studs for securing the bolt and washer against rotation, it is obvious that any other means may be employed for this purpose without departing from the spirit of my invention, the essential feature of which is the employment of a nut with recesses and a washer with an undercut edge.

Having thus described my invention, what I claim is—

1. In a nut lock, the combination, with the bolt, of a nut having recesses in its bottom or inner edges, and a circular unbroken washer having its lower outer edge undercut or beveled substantially as described, whereby a tool may be inserted beneath said washer to strike up a portion thereof, to enter one of the recesses in the nut.

2. In a nut lock, the combination, with a bolt, provided with means to prevent rotation, of a washer, also provided with means to hold said washer rigid, said washer being circular in shape and devoid of slits or teeth, and having its lower outer edge undercut or beveled, and a nut having one or more recesses in its lower or inner edge which recesses are adapted to receive the upturned, or struck up portions of the washer, substantially as shown and described.

In testimony whereof I affix my signature in presence of two witnesses.

HENRY G. LANE.

Witnesses:
HORACE HOLBROOK,
A. H. GARDNER.